P. R. HAHNEMANN.
CLUTCH.
APPLICATION FILED OCT. 31, 1913.
1,126,452.
Patented Jan. 26, 1915.
2 SHEETS—SHEET 1.
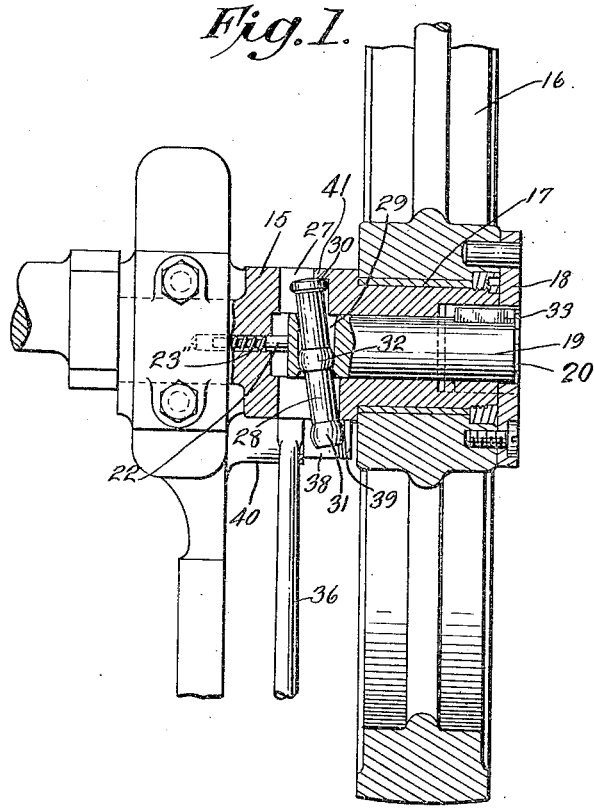
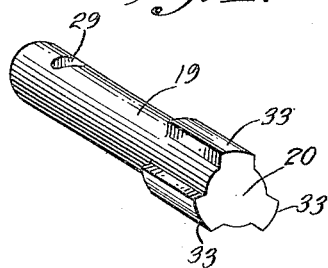
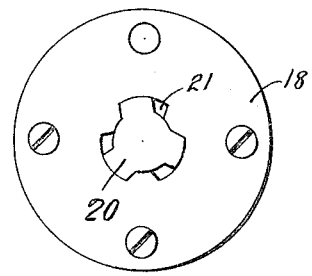
Attest:
A. C. Davis
Charles Schmitt
Inventor:
Paul R. Hahnemann
by
Atty.

P. R. HAHNEMANN.
CLUTCH.
APPLICATION FILED OCT. 31, 1913.

1,126,452.

Patented Jan. 26, 1915.
2 SHEETS—SHEET 2.

WITNESSES:

Paul R. Hahnemann
INVENTOR.

BY
ATTORNEY.

UNITED STATES PATENT OFFICE.

PAUL R. HAHNEMANN, OF MOUNT VERNON, NEW YORK.

CLUTCH.

1,126,452.  Specification of Letters Patent.  Patented Jan. 26, 1915.

Application filed October 31, 1913. Serial No. 798,606.

*To all whom it may concern:*

Be it known that I, PAUL R. HAHNEMANN, a citizen of the United States, residing at Mount Vernon, in the county of Westchester and State of New York, have invented certain new and useful Improvements in Clutches, of which the following is a specification.

This invention relates to clutches, such as are adapted to connect a driving member with a member to be driven without interruption of movement of the driving member.

The present invention more particularly contemplates a clutch for use in connection with machines in which comparatively high power is to be transmitted through the clutch mechanism, such, for instance, as stamping and other presses, with a view to securing greater efficiency with a minimum loss of time in establishing and breaking the connection through the clutch mechanism.

In addition to the provision of clutch mechanism of greater efficiency, and one which is rapid and dependable in its clutching and releasing operations, I have in view an improved construction which enables me to avail myself of an arrangement of parts which insures a more uniform and better distributed application of forces in the transmission of power through the clutch mechanism, whereby the various parts of the device would be subjected to less wear, run in better balance, make less noise, and better conserve the forces for the real work to be done.

In addition to the above, the present invention contemplates simplicity in construction and general dependability in operation.

My invention will be more readily understood by reference to the accompanying drawings, forming a part of this specification, in which—

Figure 2:
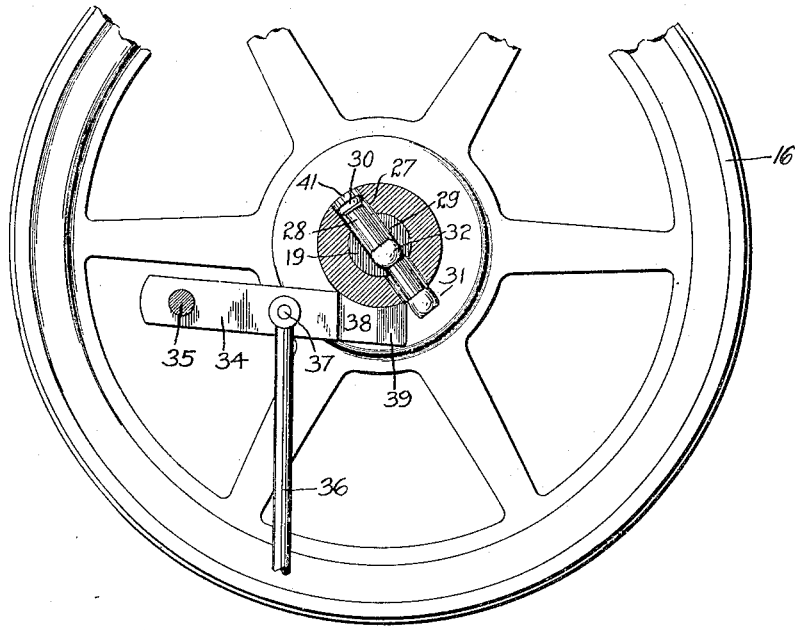
Figure 3:
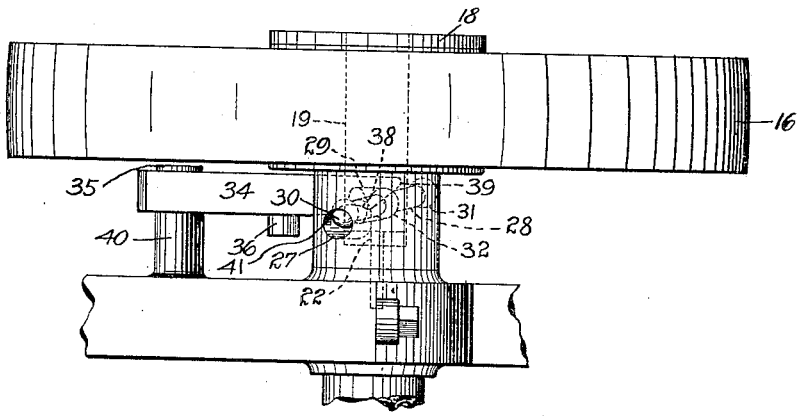

Figure 1 is a longitudinal sectional elevation of clutch mechanism embodying my invention; Fig. 2 is a section taken substantially on the broken line 2—2 of Fig. 1; Fig. 3 is a plan view of the same; Figs. 4 and 5 are detailed views hereinafter described.

Referring now to the drawings in detail, numeral 15 designates a shaft to which it is desired to transmit power from the pulley or other rotating element 16, mounted on and normally rotatable independent of the shaft 15, preferably through the medium of the bushing 17. Secured to the outer face of the pulley 16, in such manner as to substantially cap the central bore thereof and against which the end of the shaft 15 abuts, is a disk plate 18. The contiguous end of the shaft 15 is channeled for the reception of the clutch pin 19, best shown in perspective in its preferred form in Fig. 4. The channel for this clutch pin substantially conforms in configuration to the pin, and provides for a limited longitudinal sliding movement of said pin. This pin 19 is provided with a solid head of a size sufficient to insure such strength and rigidity as is required to approximate the maximum power transmitted from the pulley 16 to the shaft 15 and resist the consequent torsional strains. The disk plate 18 is provided with a central orifice 21, into which the head of the clutch-pin 19 may be projected and which in configuration is approximately complemental to the configuration of the head 20 of the pin, whereby, when this head 20 is projected into the orifice 21 of the disk 18, said disk 18 will rotate the shaft 15 with the pulley 16.

For the mere purpose of proper transmission, it will be apparent that the head 20 of the pin might be made to fit snugly within a correspondingly shaped orifice in the disk 18, but in view of the fact that the pulley 16 is rotating at high speed and the clutch-pin head 20 must be forced into the opening from a stationary member, it is obvious that the orifice 20 must be given a configuration which will provide for the very short period of time which must elapse in overcoming inertia in the pin and advancing the same into the orifice. Therefore, in applying a pin having a driving head 20 of the configuration shown in Fig. 4, which I think is the best for most practical purposes, I provide the disk 18 of an orifice 21 with the configuration shown in Fig. 5 which it will be noted, provides for the time element referred to and yet presents faces to the driving head 20 which provide for a maximum area of contact between the faces of those parts through which forces are applied.

In the rear end of the pin 19, I provide an adjustable pin or post 22 projecting into a suitable bore in the shaft 15, around which pin is the coil-spring 23, at all times exerting a yielding pressure against the head 20 of the clutch-pin which tends to force the latter in the direction of the disk 18. When the orifice 21 in the disk 18 is brought by rotation of said disk into position where it registers with the end of the driving head 20, the spring 23 is of sufficient power to force the end of said head into said orifice and thus establish a connection whereby the shaft 15 is rotated with the pulley 16. I have shown the shaft 15 provided with a transverse bore 27, and the clutch-pin 19 with a relatively smaller transverse bore 29 adapted to register with said bore 27. Passing through these bores is the loose lever-pin 28, which lever-pin I have shown provided with enlarged heads 30 and 31 at the ends thereof and an enlarged middle portion 32. The heads 30 and 31 provide suitable bearing surfaces for the lever-pin in operation, and the head 30 further coöperates with the shoulder-stop 41 at one end of the bore 27 to retain said lever-pin 28 in place, movement of said lever-pin through said bores in the other direction being prevented by reducing the opposite end of the bore 29 to engage the enlarged middle portion 32 of said lever-pin, as shown in Fig. 1. Said lever-pin being always subject to the action of the spring 23, it will be apparent that the former will at all times be held in place, yet capable of ready removal at any time, without the employment of any form of tool or implement, by merely forcing and holding back the clutch-pin 19.

An arm 34 is pivoted at 35 to a boss 40 on the frame of the machine, so as to be vertically oscillated by means of a connecting rod 36 pivoted at its upper end at 37 to said arm 34 and at its lower end to an ordinary foot-treadle (not shown in the drawings). This arm 34 is so shaped at its free end as to provide a wedge 38 having a comparatively thin end edge 39 which, when said arm 34 is in its normally raised position, engages the head 31 at the end of the lever-pin 28, as the latter is revolved with the shaft 15, and serves to operate said lever with the other end thereof as a fulcrum to retract said clutch-pin and withdraw the head 20 thereof from the orifice 21 in the disk-plate 18, thereby separating the clutch members and terminating the application of forces from one to the other and the transmission of power to the shaft 15 which, in view of the weight of the load carried by the latter, the device being primarily designed for use in connection with a press, quickly comes to a condition of rest. The foot treadle being depressed, however, thus through the rod 36 withdrawing the wedge 38 from the path of movement of the head 31 of the lever-pin 28, the spring 23 will at once operate to again render the clutch mechanism effective.

While I do not desire to limit myself to any particular form or configuration of clutch pin, I have shown the latter in this case as being substantially cylindrical in form and being provided at its operative end with a plurality of comparatively short longitudinal ribs 33, these ribs providing what might be termed a star-shaped clutch-pin head, as shown in Fig. 4. The orifice 21 in the disk 18, as shown in Fig. 5, is of substantially complemental configuration, the recesses for the reception of the ribs being slightly greater in width than the width of said ribs in order to provide for the time element hereinbefore referred to. It will be apparent, however, that any desired form of non-circular clutch-pin head may be employed, coöperating with a disk-plate orifice of substantially complemental configuration, without departing from the spirit of my invention.

I am aware that it is not broadly new to provide a pin in either a driving or driven element adapted to be forced into an orifice in a driven or driving element, without interruption of movement of the driving element, for the purpose of intermittently or periodically transmitting power from one element to another, but so far as I am aware, this clutch-pin has always been arranged eccentrically with respect to the rotating elements, a construction which obviously results in an uneven or unequal distribution of the forces, resulting in greater wear and shorter life of the parts. It will be noted in connection with my invention that the clutch-pin is concentrically mounted with respect to both rotating elements, possessing the advantages which I have hereinbefore set forth, and yet is readily reciprocated to connect and disconnect the clutch elements at any time desired, irrespective of continuous rotation of the driving element. Furthermore, while I am aware that it is not new to employ a loose lever-pin in connection with a clutch-pin which is eccentrically mounted, such a construction being heretofore necessary in order to render the various parts removable for repair or replacement without practically dismantling the entire machine, so far as I am aware such a lever-pin has never been employed in connection with a clutch-pin which is concentrically mounted with respect to the driving and driven elements, and particular attention is directed to the fact that in a device embodying my invention first the lever-pin and then the clutch-pin may be removed without removal of the fly-wheel or pulley, without the removal of screws, and without necessity for the use of any tool or implement. Furthermore, the end plate 18 leaves exposed the end of the shaft 15, thereby preventing the accumulation of abrasion from the contact surfaces of the clutch members.

Other modifications of minor details of my improved clutch will doubtless readily suggest themselves to those skilled in the art to which it appertains, and I therefore do not desire to limit my invention to the specific construction herein shown and described.

I claim as new and desire to secure by Letters Patent:

1. The combination, with concentrically arranged rotating driving and driven members, of a concentrically located clutch member, a lever rotating therewith to operate said clutch member, and means reciprocable to and from a position in the path of movement of said lever to actuate said lever.

2. The combination with concentrically arranged rotating driving and driven members, of a concentrically located reciprocating clutch-pin, a lever associated and rotating therewith to reciprocate said clutch-pin, and means for actuating said lever, said means being movable to and from operative position irrespective of rotation of said members.

3. The combination, with concentrically arranged rotating driving and driven members, of a concentrically located clutch member normally spring-pressed to operative position, a lever associated and rotating therewith to control movement of said clutch member, and means reciprocable to and from a position in the path of movement of said lever to actuate said clutch-pin through said lever against the action of the spring.

4. The combination with concentrically arranged rotating driving and driven members, of a concentrically located reciprocating clutch-pin normally spring-pressed to operative position, a lever associated and rotating therewith to actuate said clutch-pin against the action of its spring, and means normally in but removable from the path of movement of the end of said lever to engage the latter and withdraw said clutch-pin from operative position.

5. The combination with concentrically arranged rotating driving and driven members, of a concentrically located clutch-pin spring-pressed in one direction, a lever associated and rotating therewith to actuate said clutch-pin in the other direction, and a wedge-member movable to and from a position in the path of movement of said lever to operate the same.

6. The combination, with concentrically arranged rotating driving and driven members, of a concentrically located clutch-pin spring-pressed to operative position, a lever associated and rotating therewith to retract said clutch-pin to a position of inoperativeness, and a wedge-member normally in but removable from the path of movement of the end of said lever to engage the latter and actuate said clutch-pin therethrough.

7. The combination, with a rotatable shaft and a member independently rotatable thereon, of a concentrically located clutch-pin reciprocable within said shaft to connect and disconnect said member, said shaft and said clutch-pin being provided with registering transverse bores, a loose lever-pin passing through said bores, and means movable to and from a position in the path of movement of the end of said lever-pin to engage and release the same and reciprocate said clutch-pin.

8. The combination, with a rotatable shaft and a member independently rotatable thereon, of a concentrically located clutch-pin reciprocable within said shaft to connect and disconnect said member, said shaft and said clutch-pin being provided with registering transverse bores, a loose lever-pin passing through said bores, means movable to and from a position in the path of movement of the end of said lever pin to engage and release the same and reciprocate said clutch-pin and means for retaining said lever-pin in place.

9. The combination, with a rotatable shaft and a member independently rotatable thereon, of a concentrically located clutch-pin reciprocable within said shaft to connect and disconnect said member, said shaft and said clutch-pin being provided with registering transverse bores, a loose lever-pin passing through said bores, means movable to and from a position in the path of movement of the end of said lever-pin to engage and release the same and reciprocate said clutch-pin, said last mentioned means permitting of the ready removal of lever and clutch pins without the removal of any other parts of the device.

10. The combination, with a rotatable shaft and a pulley or the like mounted at the end thereof to rotate independently thereof, of a disk-plate capping the bore of said pulley, the end of said shaft abutting said plate, a clutch-pin mounted to reciprocate longitudinally within the end of said shaft, said clutch-pin being spring-pressed to operative position and being provided with a non-circular end adapted to be projected into a substantially complementally-shaped orifice in said plate, said pin and said orifice being concentric with respect to both shaft and pulley, a lever associated and rotating with said clutch-pin and means normally in but removable from the path of movement of said lever to engage the same and withdraw said clutch-pin from operative position against the action of its spring.

11. The combination, with a rotatable shaft and a pulley or the like mounted at the end thereof to rotate independently thereof, of a disk-plate capping the bore of said pulley, the end of said shaft abutting said plate, a clutch pin mounted to reciprocate longitudinally within the end of said shaft and provided with a non-circular end adapted to be projected into a substantially complementally-shaped orifice in said plate, said pin and said orifice being concentric with respect to both shaft and pulley, a lever associated and rotating with said clutch-pin to reciprocate said clutch-pin, and means for actuating said lever, said means being movable to and from operative position irrespective of location of said shaft and pulley.

In testimony of the foregoing I have hereunto set my hand in the presence of two witnesses.

PAUL R. HAHNEMANN.

Witnesses:
C. J. Westin,
Wm. A. G. Gunther.

Copies of this patent may be obtained for five cents each, by addressing the "Commissioner of Patents, Washington, D. C."